US008869737B2

(12) United States Patent
Takahashi et al.

(10) Patent No.: US 8,869,737 B2

(45) Date of Patent: Oct. 28, 2014

(54) CYLINDER BORE SPRAYING APPARATUS AND SPRAYED FILM FORMING METHOD

(75) Inventors: Masatsugu Takahashi, Machida (JP); Hideo Takahashi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 594 days.

(21) Appl. No.: 12/863,082

(22) PCT Filed: Feb. 27, 2009

(86) PCT No.: PCT/IB2009/000426

§ 371 (c)(1), (2), (4) Date: Jul. 15, 2010

(87) PCT Pub. No.: WO2009/106981

PCT Pub. Date: Sep. 3, 2009

(65) Prior Publication Data

US 2010/0316798 A1 Dec. 16, 2010

(30) Foreign Application Priority Data

Feb. 29, 2008 (JP) ................................ 2008-049942
Dec. 10, 2008 (JP) ................................ 2008-314970

(51) Int. Cl.

| | |
|---|---|
| ***C23C 4/02*** | (2006.01) |
| ***B05B 15/04*** | (2006.01) |
| ***F02F 1/00*** | (2006.01) |
| ***C23C 4/12*** | (2006.01) |
| ***B05B 13/06*** | (2006.01) |
| *F02F 1/18* | (2006.01) |

(52) U.S. Cl.

CPC ............. *C23C 4/127* (2013.01); *B05B 13/0618* (2013.01); *B05B 15/045* (2013.01); *F02F 1/18* (2013.01); *F02C 2253/12* (2013.01)

USPC ........... 118/301; 118/317; 427/446; 427/236; 427/239

(58) Field of Classification Search

CPC .... B05B 13/0618; B05B 15/045; C23C 4/12; C23C 4/121; C23C 4/124; C23C 4/127; F05C 2253/12; F02F 1/00; F02F 1/18

USPC ......... 427/230–239, 282, 446, 449, 453, 455, 427/456; 118/301, 317

See application file for complete search history.

(56) References Cited

U.S. PATENT DOCUMENTS

| | | | | |
|---|---|---|---|---|
| 2002/0172769 | A1 | 11/2002 | Herber et al. | |
| 2007/0190272 | A1 * | 8/2007 | Kanai et al. | 428/34.1 |
| 2008/0176000 | A1 * | 7/2008 | Bohnheio et al. | 427/446 |

FOREIGN PATENT DOCUMENTS

| | | | |
|---|---|---|---|
| JP | 7-070729 | A | 3/1995 |
| JP | 11-106891 | | 4/1999 |
| JP | 2002-339053 | A | 11/2002 |
| JP | 2005-002449 | A | 1/2005 |
| JP | 2008-223503 | A | 9/2008 |
| JP | 2009197309 | A | 9/2009 |

* cited by examiner

*Primary Examiner* — William Phillip Fletcher, III

(74) *Attorney, Agent, or Firm* — Young, Basile, Hanlon & MacFarlane, P.C.

(57) ABSTRACT

The invention provides a cylinder bore spraying apparatus capable of carrying out honing processing and finishing after a sprayed film is formed in a cylinder bore in a state where the cylinder bore is deformed by a dummy head. A sprayed film is formed on an inner peripheral surface of a cylinder bore by a spraying gun in a state where a dummy head is pressed against a cylinder block such that a cylinder head is fastened to the cylinder block by a bolt. Thereby, a deformed state of a cylinder bore is simulated. A protection mask prevents the sprayed film from adhering to the dummy head and is detachably attached to the liner hole of the dummy head.

17 Claims, 15 Drawing Sheets

CYLINDER BORE SPRAYING APPARATUS AND SPRAYED FILM FORMING METHOD

CROSS-REFERENCE TO RELATED APPLICATIONS

This application claims priority from Japanese Patent Application Serial Nos. 2008-049942, filed Feb. 29, 2008, and 2008-314970, filed Dec. 10, 2008, each of which is incorporated herein in its entirety by reference.

TECHNICAL FIELD

The present invention relates generally to a cylinder bore spraying apparatus that coats an inner peripheral surface of a cylinder bore with a sprayed film, and to a sprayed film forming method.

BACKGROUND

For producing engines of recent automobiles, there is a known cylinder bore processing apparatus that carries out finish processing while providing the cylinder block with a deformation which corresponds to the deformation when a cylinder head is actually fastened to the cylinder block by means of a bolt. According to this processing apparatus, as disclosed in Japanese Patent Application Laid-open (JP-A) No. 2008-223503, a dummy head corresponding to the cylinder head is mounted on the cylinder block, a portion near the cylinder bore is pressed by a force corresponding to a pressing force caused by the bolt fastening, the cylinder bore is deformed, and the deformed cylinder bore is honed.

According to this processing apparatus, an engine can be produced in which deformation of the cylinder bore caused by a fastening force when the cylinder head is actually fastened by a bolt is taken into consideration. Accordingly, roundness of the cylinder bore when the engine is actually operated can be improved.

In engines of recent automobiles, especially in engines having aluminum cylinder blocks, in order to enhance heat radiation performance and a compression ratio, a metal (iron or the like) sprayed film is formed on the cylinder bore inner peripheral surface as a cylinder liner, and the resulting sprayed film is honed and finished.

The sprayed film is formed by plasma spraying metal to the cylinder bore inner peripheral surface from spraying means, and a protection mask apparatus is used so that the injected spraying particles do not scatter and adhere unnecessarily.

Such a protection mask apparatus is disclosed in JP-A No. 2002-339053, which includes a hollow cylindrical outer portion disposed on an upper surface of a cylinder block so as to surround a cylinder bore and an insertion member detachably provided on an inner peripheral surface of the outer portion (also called a separate type protection mask apparatus). There is also a protection mask apparatus in which a coating layer is formed on an inner peripheral surface of an outer portion (also called an integral type protection mask apparatus).

BRIEF SUMMARY

Embodiments of a spraying apparatus for forming a sprayed film on an inner peripheral surface of a cylinder bore of a cylinder block and methods of forming such a sprayed file are taught herein. One exemplary apparatus includes a cylinder block pressing apparatus that includes a dummy head that is cylinder head-shaped and includes a liner hole. When the cylinder block is pressed through the dummy head, a deformed state of the cylinder bore when a cylinder head is fastened to the cylinder block by means of a bolt is simulated. This apparatus also includes spraying means that injects molten particles to the inner peripheral surface of the cylinder bore to form a sprayed film and a protection mask a protection mask detachably attached to the liner hole of the dummy head and formed such that spraying particles adhered to the inner peripheral surface of the cylinder bore do not adhere to the dummy head.

Details and variations on this embodiment and others are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the case of a finished cylinder block prepared by honing a cylinder bore formed with a sprayed film, if a cylinder head is actually fastened by a bolt, the cylinder bore is deformed by its fastening force or a thermal influence when the engine is actually operated.

Therefore, it is preferable that a sprayed film is formed on the cylinder bore when the cylinder bore is deformed by a dummy head of a cylinder bore processing apparatus. However, if a separate type protection mask apparatus is applied to the dummy head, the protection mask apparatus itself is increased in size, and in the case of a cylinder block having a plurality of cylinder bores, since there is no sufficient size between the cylinder bores, the protection mask apparatus cannot be inserted and installed. Alternatively, the protection mask apparatus becomes thin, and there is a fear that rigidity capable of withstanding the removing processing of the sprayed film cannot be secured.

If the integral type protection mask apparatus is applied to a dummy head, the sprayed film is formed on the inner peripheral surface of the liner hole of the dummy head. If the sprayed film is removed from the dummy head, however, there is a fear that the dummy head itself will be damaged, shortening the lifetime of the expensive dummy head. This is disadvantageous for production costs. However, when attached particles remain, there is a fear that the function of the dummy head is deteriorated.

Embodiments of the present invention, in contrast, provide a cylinder bore spraying apparatus and a sprayed film forming method capable of preventing a dummy head from being damaged without a need to remove sprayed film on a dummy head body. In the embodiments, for example, a protection mask is attachable to and detachable from the liner hole of the dummy head, so it is unnecessary to remove the sprayed film from the dummy head body, and it is only necessary to remove the sprayed film from the protection mask. Further, the protection mask is reinforced by the dummy head, so the protection mask can be thin. The adhered sprayed film can be removed after the protection mask is detached. Accordingly, not only the expensive dummy head but also the protection mask can be reused, which is advantageous in terms of cost.

Certain embodiments of the invention are explained with reference to the drawings.

Figure 1:
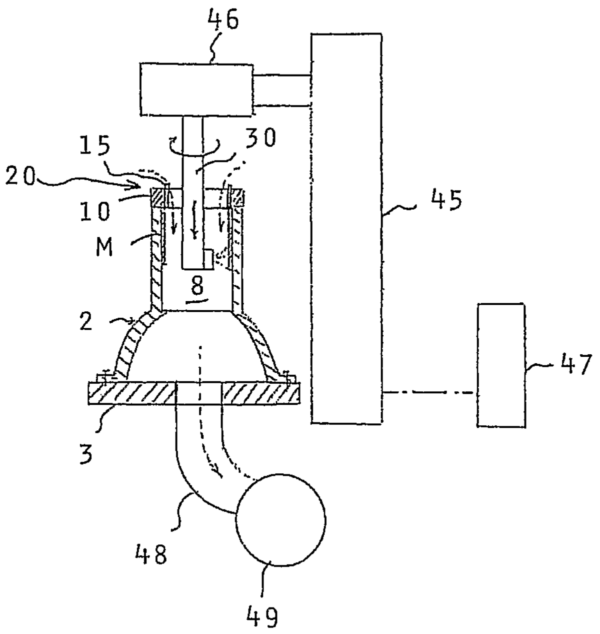
FIG. 1 is a schematic sectional view showing a cylinder bore spraying apparatus according to a first embodiment.
Figure 2:
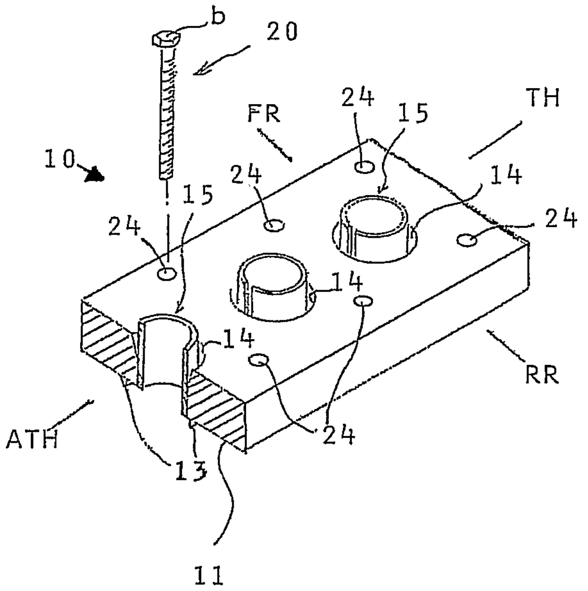
FIG. 2 is a schematic perspective view of a dummy head.

The cylinder bore spraying apparatus according to the first embodiment includes a cylinder block pressing apparatus 20 and a spraying gun 30 as shown in FIG. 1. The cylinder block pressing apparatus 20 presses an upper surface of the cylinder block 2, i.e., a surface thereof on which a cylinder head is mounted. As shown in FIG. 2, the cylinder block pressing apparatus 20 includes a cylinder head-shaped dummy head 10 (that is, a jig corresponding to a cylinder head), and a bolt b for fastening the dummy head 10 to the upper surface of the cylinder block 2. The dummy head 10 is pressed against the cylinder block 2 by a fastening force of the bolt b.

The spraying gun 30 injects molten metal particles to an inner peripheral surface of a cylinder bore 8 of the cylinder block 2 pressed by the cylinder block pressing apparatus 20, thereby forming a sprayed film M. The molten particles are sprayed by a spraying robot 45 by moving the rotating device 46 up and down as shown in FIG. 1. The spraying gun 30 is suspended from the rotating device 46. A supplying device 47 is connected to the spraying robot 45. The supplying device 47 supplies a power source, auxiliary gas or spraying material. The cylinder block 2 is fixed to a support stage 3 by clamping means (not shown). A discharge fan 49 is connected to a lower surface of the support stage 3 through a discharge duct 48. Air in the cylinder block 2 is sucked by the discharge fan 49 through an opening of the support stage 3 and the discharge duct 48, and non-molten particles in the cylinder bore 8 and auxiliary gas from the spraying gun 30 are discharged from the cylinder bore 8.

As shown in FIG. 2, a plurality of liner holes 14 are formed in and pass through the dummy head 10. Each liner hole 14 is brought into communication with the cylinder bore 8 in a state where the dummy head 10 is fastened to the cylinder block 2, and the spraying gun 30 is inserted into the cylinder bore 8 through the liner hole 14.

The spraying apparatus of this embodiment includes protection masks 15, which are mounted on the liner holes 14 as shown in FIGS. 1 and 2. Each protection mask 15 has a thin and cylindrical shape in a state where it is mounted on the liner hole 14 and has elasticity in the spraying direction (that is, a direction perpendicular to the length of the cylindrical shape).

Figure 3A:
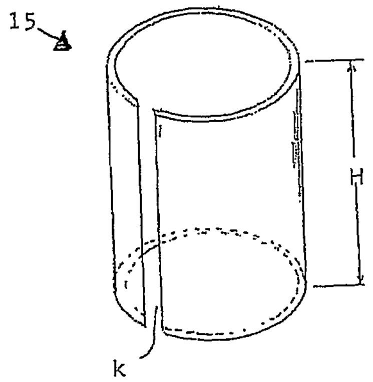
FIG. 3A is a schematic perspective view of a protection mask.

As shown in FIG. 3A, the protection mask 15 is obtained by forming a thin metal plate made of spring steel into a cylindrical shape, and a portion thereof is formed with a slit-like opening K extending over the entire length in its axial direction. Thus, the protection mask 15 is light in weight and is relatively inexpensive, and this is advantageous in terms of cost. The protection mask 15 can expand and contract in the spraying direction and can easily be mounted on the dummy head 10. If a sprayed film M adheres to the protection mask 15, it can easily be replaced by a new one. A shape of an end of the metal plate in the opening K is not limited to a simple flat fracture-plane and is preferably a so-called tapered surface (see FIG. 13A) into which a later-described tool 53 can easily be inserted.

Figure 3B:
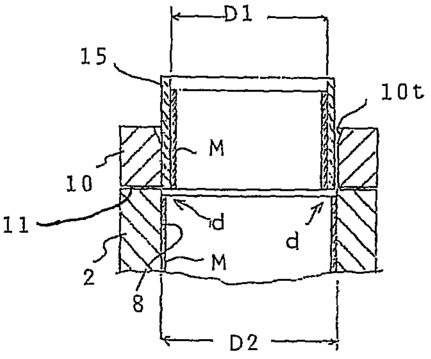
FIG. 3B is a partial, cross-sectional view showing a mounting state of the protection mask of FIGS. 1 and 3A.

A length H of the protection mask 15 in its axial direction is slightly longer than a depth of the liner hole 14 of the dummy head 10 so as to protect the dummy head 10 against adhesion of the spraying particles, and an upper end of the protection mask 15 projects from an upper surface of the dummy head 10 as shown in FIG. 3B. With this structure, when outside air is introduced from the upper end of the cylinder bore 8 through the protection mask 15 at the time of spraying operation, the protection mask 15 conforms the outside air to the shape of the inner peripheral surface of the cylinder bore, and the sprayed film M can uniformly be formed on the inner peripheral surface of the cylinder bore 8.

A lower end surface of the protection mask 15 extends to substantially the same plane as a lower end abutment surface 11 of the dummy head 10 in the axial direction of the cylinder bore 8. With this structure, the sprayed film M can reliably be formed from a top of the cylinder bore 8.

An inner diameter $D_1$ of the protection mask 15 when the protection mask 15 is disposed in the liner hole 14 of the dummy head 10 is smaller than an inner diameter $D_2$ of the cylinder bore 8. With this structure, when the sprayed film M is formed by the spraying gun 30, the sprayed film M is divided into a sprayed film M on the side of the liner hole 14 and a sprayed film M on the side of the cylinder bore 8 by a step d generated at a boundary between the liner hole 14 of the dummy head 10 and the cylinder bore 8, and the dummy head 10 and the cylinder block 2 can be cleanly separated from each other.

The lower end abutment surface 11 of the dummy head 10 is formed with an annular projection 13, which surrounds the liner hole 14 as shown in FIG. 2. The projection 13 is formed for simulating a gasket that is, in a complete engine, nipped between the cylinder block 2 and the cylinder head.

The molten particles are sprayed by the spraying gun 30 in a state where the dummy head 10 is affixed to the upper surface of the cylinder block 2 by the bolt b. The bolt b is threadedly inserted into a screw hole 24 formed in the cylinder block 2 for mounting the cylinder head, the cylinder block 2 is pulled toward the dummy head 10 by an axial force of the bolt b, and the projection 13 of the dummy head 10 is pressed toward the cylinder block 2.

If the cylinder head is actually fastened by means of the bolt, the cylinder bore is deformed by its fastening force or thermal influence when the engine is actually operated. Therefore, the dummy head 10 is affixed to the upper surface of the cylinder block 2 by the bolt b at the time of production, and the sprayed film M is formed on the cylinder bore 8 in a state where the cylinder bore 8 is deformed. Then, the state where the dummy head 10 is mounted is maintained, and the surface of the sprayed film M is finished by honing using a finishing tool. With this, the engine is smoothly operated when it is actually installed, and this is preferable.

As shown in FIG. 2, the dummy head 10 is provided with bolt holes 24 at locations surrounding each liner hole 14, i.e., at an intermediate portion between a thrust-anti-thrust direction (TH-ATH direction) and a front-rear direction (FR-RR direction) of each liner hole 14.

Figure 4:
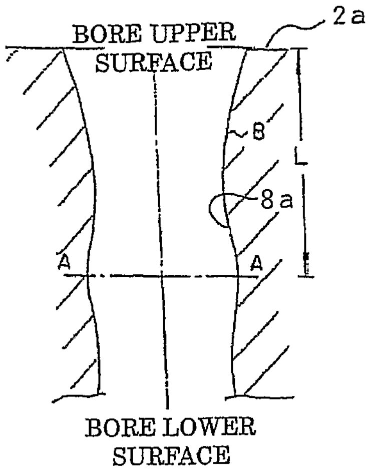
FIG. 4 is a schematic, partial sectional view oriented as in FIG. 1 showing a deformed state of a cylinder bore after mounting a dummy head.
Figure 5:
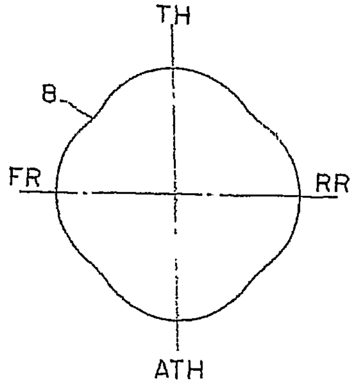
FIG. 5 is a plan view of the cylinder block of FIG. 4.

If bolts b are provided at these positions surrounding the liner holes 14 in this manner, the inner peripheral surface 8*a* of each cylinder bore 8 can be deformed as shown in FIGS. 4 and 5. This deformed state of the cylinder bore 8 simulates the deformed state in the actual engine caused by fastening the cylinder head to the cylinder block 2 using a bolt.

The cylinder bore inner peripheral surface 8*a* is deformed by pressing such that a portion having a predetermined length L from the upper surface of the cylinder block 2 (a cylinder head mounting surface 2*a*) is the largest, and the cylinder bore inner peripheral surface 8*a* is protruded and deformed outward in the spraying direction as shown in FIG. 4. The transverse cross section of this portion has a shape such that the liner hole 14 in the thrust-anti-thrust direction (TH-ATH direction) and the front-rear direction (FR-RR direction) protrudes and deforms outward, and an intermediate portion between the thrust-anti-thrust direction (TH-ATH direction) and the front-rear direction (FR-RR direction) does not protrude outward as much due to the influence of the bolt b, as shown in FIG. 5. The deformed shape is a so-called "petal shape" that, as mentioned above, simulates the deformed state of the cylinder bore caused when the cylinder head is fastened to the cylinder block 2 by a bolt.

Figure 6:
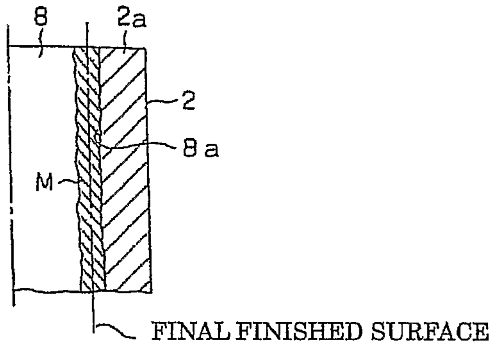
FIG. 6 is a sectional view showing a ground processing state of the cylinder bore.

Ground processing of a cylinder bore 8 is carried out while maintaining the deformed state. As shown in FIG. 6, the inner peripheral surface 8*a* is formed into rough indented surfaces using fine boring. With this, the sprayed film M that will be formed later can be strongly coupled to the indented surfaces.

Figure 7A:
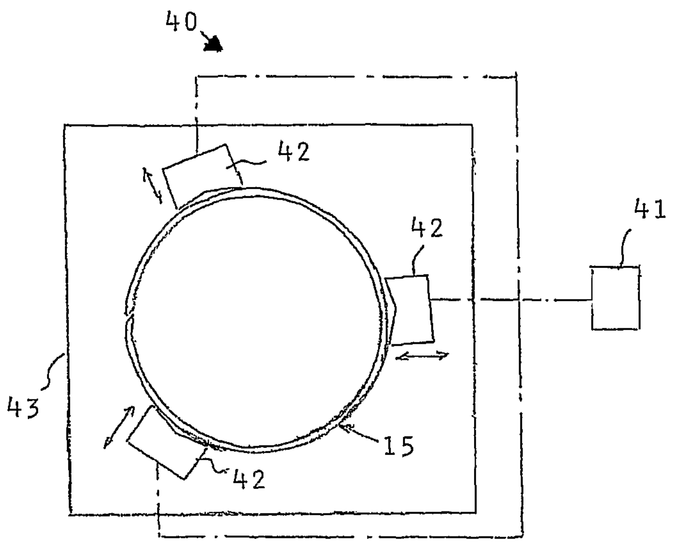
FIG. 7A is a schematic plan view showing a mask attaching/detaching portion that mounts the protection mask on the dummy head.

A mask attaching/detaching portion 40 that attaches the protection mask 15 to the dummy head 10 is disposed near the spraying apparatus. As shown in FIG. 7A, the mask attaching/detaching portion 40 includes a mask attaching/detaching robot 41 and three mask support members 42. The mask attaching/detaching robot 41 moves the mask support members 42 in the spraying direction, grasps one of the protection masks 15 stocked on a mask stage 43, and mounts the protection mask 15 in the liner hole 14 of the dummy head 10 or detaches the protection mask 15 from the liner hole 14.

The protection mask 15 has elasticity so it can expand and contract in the spraying direction. Therefore, the diameter of the protection mask 15 can be reduced from outside by the three mask support members 42 so it can easily be inserted into the liner hole 14 of the dummy head 10. If the force in the diameter-reducing direction is released, as shown in FIG. 7B, the protection mask 15 is abutted against and fixed to an inner surface of the liner hole 14 by the elasticity of the protection mask 15 by its own force.

Figure 7B:
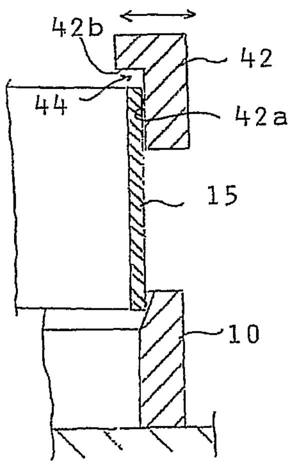
FIG. 7B is a schematic sectional view showing the mounting state of the protection mask by the mask attaching/detaching portion according to FIG. 7A.

Here, as shown in FIG. 7B, each mask support member 42 has a reversed L-shaped cross section, and a step 44 is formed on an inner periphery of an upper portion of the mask support member 42. The step 44 functions to abut against and hold the upper portion of the cylindrical thin metal plate that forms the protection mask 15 by its ventral surface 42*a* and functions to press an upper end of the thin metal plate by its jaw surface 42*b* to push the upper end into the liner hole 14.

A sprayed film removing apparatus 50 automatically removes the sprayed film M adhered to the protection mask 15 and drops the peeled sprayed film M downward from the inner side surface of the protection mask 15. Although the sprayed film removing apparatus 50 is provided independently from the cylinder bore spraying apparatus, it is preferable but not necessary to dispose the sprayed film removing apparatus 50 near the mask attaching/detaching portion 40 because the processing speed of the protection mask 15 is thereby increased.

Figure 8:
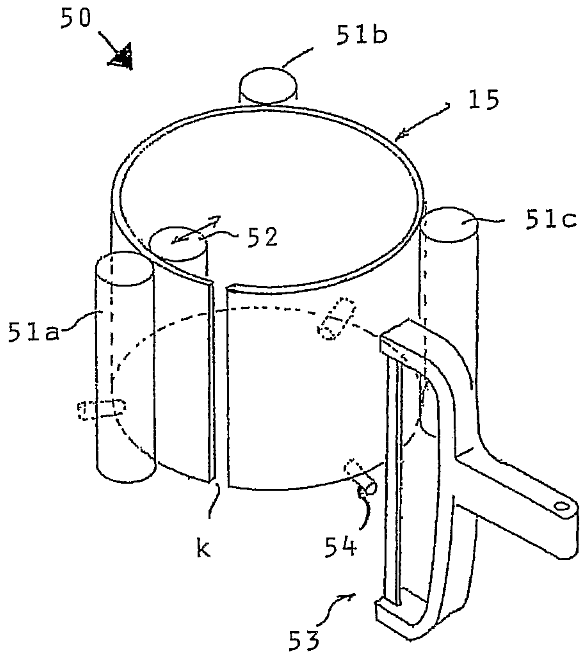
FIG. 8 is a schematic perspective view showing a sprayed film removing apparatus.

As shown in FIG. 8, the sprayed film removing apparatus 50 includes three outer rollers 51*a*, 51*b* and 51*c* (collectively, the outer rollers 51), which abut against an outer peripheral surface of the protection mask 15 and hold the outer rollers, and an inner roller 52, which is disposed in the protection mask 15 held by the outer rollers 51 and abuts against the sprayed film M adhered to the inner peripheral surface of the protection mask 15 or to the protection mask 15. The sprayed film removing apparatus 50 also includes a tool 53 inserted in between the protection mask 15 and the sprayed film M from the opening K of the protection mask 15.

The outer rollers 51 and the inner roller 52 rotate the protection mask 15 around its axis and have lengths in the axial direction greater than the axial length H of the protection mask 15. Even if the protection mask 15 is thin and prone to be deformed, the outer rollers 51 and the inner roller 52 elastically abut against and hold the protection mask 15 so as to smoothly turn the protection mask 15 without generating slipping in the axial direction.

The inner roller 52 rotates the protection mask 15 and downwardly drops the peeled sprayed film M from the protection mask 15. The inner roller 52 is controlled by a controller such that the inner roller 52 can assume both an abutment position where the inner roller 52 comes into abutment against the inner peripheral surface of the protection mask 15 and rotates the protection mask 15 around its axis and a retreating position where the inner roller 52 separates from the protection mask 15 and downwardly drops the peeled sprayed film. With this, the one inner roller 52 can both rotate and drive the protection mask 15 and discharge the peeled sprayed film M, and the apparatus structure can be simplified.

Especially, the inner roller 52 is controlled such that after the peeled sprayed film M is dropped downward, the inner roller 52 and the outer roller 51*a* pinch the protection mask 15 and rotate the protection mask 15. With this, it is possible to check whether the sprayed film M is peeled off from the protection mask 15 without using a separate device. This is described in detail hereinafter.

In order to more reliably hold the protection mask 15 by the outer rollers 51 and the inner roller 52, it is preferable to provide, in a lower region of the outer roller 51 or the inner roller 52, one or more support rollers 54 that support the protection mask 15. It is preferable that the support rollers 54 be movable in the spraying direction so that they do not hinder the dropping of the sprayed film M.

The tool 53 is inserted in between the protection mask 15 and the sprayed film M from the opening K to peel and remove the sprayed film M or adhered molten particles from the protection mask 15. The tool 53 can, for example, have a jigsaw shape.

Next, operation of the apparatus is described with reference to FIGS. 9A to 14.

Figure 10A:
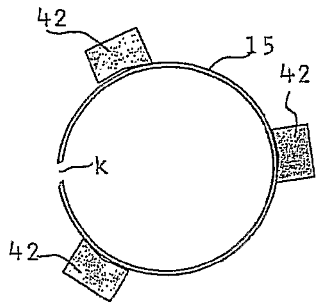
FIG. 10A is a plan view corresponding to a state shown in FIG. 9A.
Figure 10B:
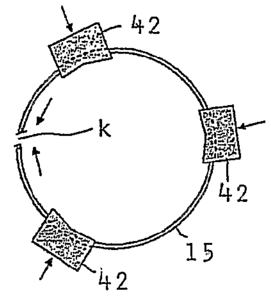
FIG. 10B is a plan view corresponding to a state shown in FIG. 9B.
Figure 14:
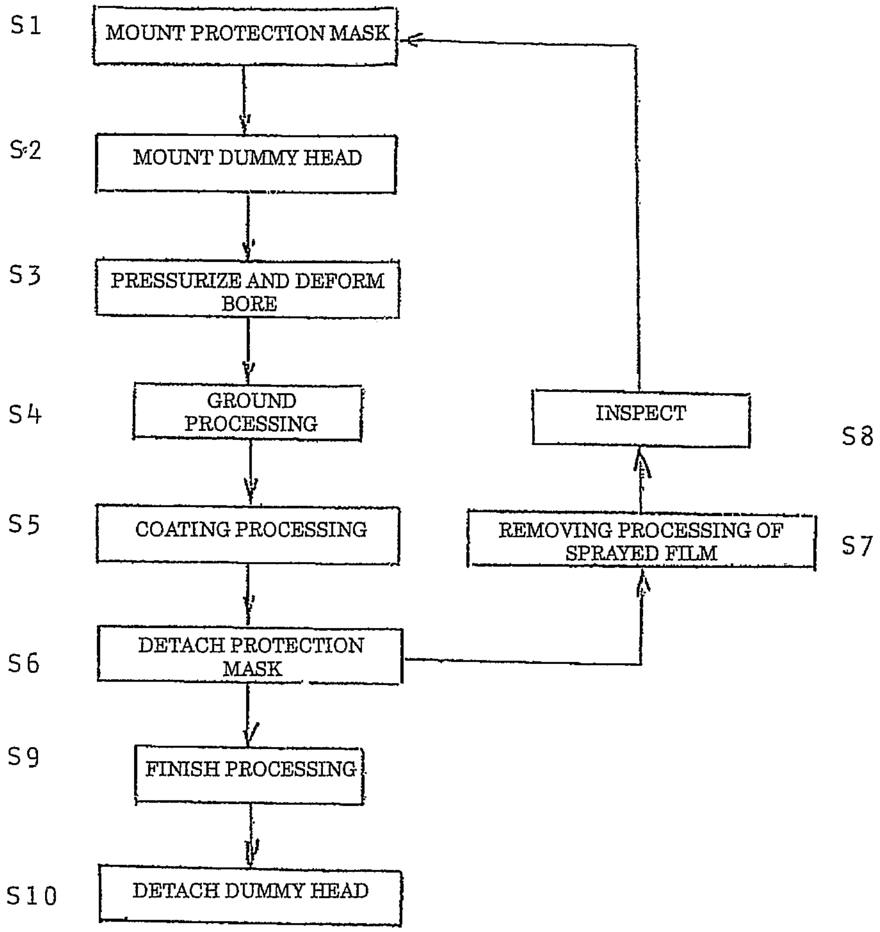
FIG. 14 is a flowchart showing forming steps of the sprayed film in the cylinder bore.

First, the protection mask 15 is mounted on the dummy head 10 (step 1 in FIG. 14). The mask attaching/detaching robot 41 operates the mask support member 42 to grasp one of the many protection masks 15 standing on the mask stage 43. At that time, the mask support member 42 moves from a state shown in FIGS. 9A and 10A to a state shown in FIGS. 9B and 10B. With this movement, the ventral surface 42*a* of the step 44 abuts against and presses an outer peripheral surface of an upper portion of the protection mask 15 standing on the mask stage 43, and the three mask support members 42 grasp the outer peripheral surface. With this grasp, the opening K is narrowed to reduce the diameter of the protection mask 15 as shown in FIG. 10B.

Figure 9A:
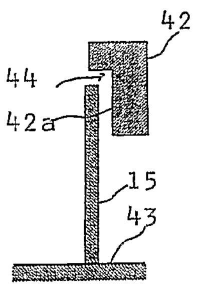
FIGS. 9A to 9F are schematic vertical sectional views showing attaching and detaching operations of the protection mask in the order of steps.
Figure 9B:
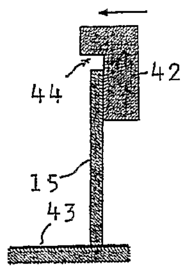
Figure 9C:
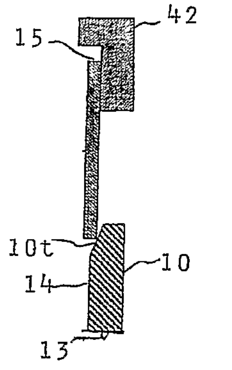

The mask attaching/detaching robot 41 maintains this grasp state, and as shown in FIG. 9C, the mask attaching/detaching robot 41 operates the mask support member 42 and conveys the protection mask 15 to the liner hole 14 of the dummy head 10.

Figure 9D:
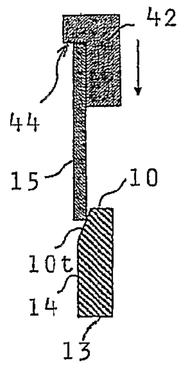

As shown in FIG. 9D, the mask attaching/detaching robot 41 lowers each mask support member 42, the upper surface of the protection mask 15 is pressed by the jaw surface 42*b* of the step 44 of the mask support member 42, and the protection mask 15 is inserted into the liner hole 14.

An upper, inner portion of the liner hole 14 of the protection mask 15 is formed with a tapered surface 10*t*. Therefore, the protection mask 15 is reduced in diameter by the tapered surface 10*t* and is smoothly inserted.

Figure 9E:
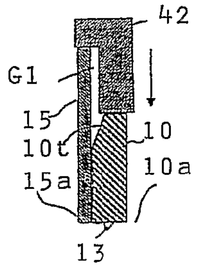

Next, as shown in FIG. 9E, the mask attaching/detaching robot 41 is pushed down until a lower end surface of the protection mask 15 coincides with a lower end abutment surface 11 of the dummy head 10, i.e., until the lower end surface of the protection mask 15 is opposed to the lower end abutment surface 11 of the dummy head 10.

Figure 11:
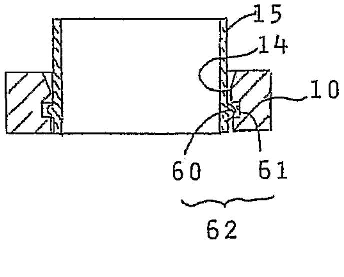
FIG. 11 is a schematic sectional view showing a positioning portion that positions the protection mask on the dummy head.

In this case, a plate member against which the lower end surface abuts may be disposed on the lower end abutment surface 11 of the dummy head 10. As another means, as shown in FIG. 11, a projection 60 may be formed at a predetermined position on the outer peripheral surface of the protection mask 15, and a recess 61 may be formed in the inner peripheral surface of the liner hole 14 of the dummy head 10. The projection 60 may be fitted to the recess 61, thereby forming a positioning portion 62 that positions the protection mask 15. With this structure, the lower end surface of the protection mask 15 can easily coincide with the lower end abutment surface 11 of the dummy head 10, and the sprayed film M can reliably be formed from the top of the cylinder bore 8. The relationship between the projection and the recess of the positioning portion 62 may be reversed, of course. When the sprayed film M is peeled from the protection mask 15 provided at its outer peripheral surface with such a projection 60, the outer roller 51 may be divided into two, i.e., upper and lower portions, so that the projection 60 does not abut, and the projection 60 may be located therebetween.

Figure 9F:
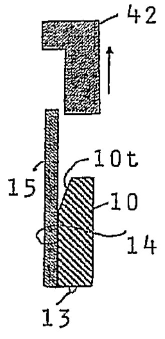
Figure 10C:
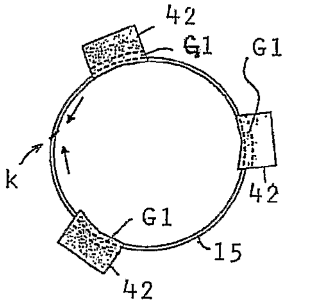
FIG. 10C is a plan view corresponding to a state shown in FIGS. 9D and 9E.

If the diameter of the protection mask 15 is reduced, a gap G1 is generated between the mask support member 42 and the protection mask 15 (see FIGS. 9E and 10C). If the gap G1 is formed, the mask support member 42 can be moved upward without any hindrance as shown in FIG. 9F, and the protection mask 15 is expanded by the elasticity of its own, abuts against the liner hole 14 and is mounted on the dummy head 10.

If the mounting operation of the protection mask 15 is completed, the mask support member 42 is returned to the position of the mask stage 43 by the mask attaching/detaching robot 41, and the next grasping operation of the protection mask 15 is carried out.

If the protection masks 15 are mounted in all of the liner holes 14, the dummy head 10 is mounted on the cylinder block 2 by bolt b (step 2 in FIG. 14). That is, the cylinder block 2 is placed on the support stage 3, the cylinder block 2 is fixed and held by a clamping member, and then the dummy head 10 is mounted on a cylinder head mounting surface 2*a* of the cylinder block 2 by bolt b.

An inner peripheral surface of the cylinder bore 8 of the cylinder block 2 is deformed by fastening the bolt b (step 3 in FIG. 14). This deformed state is maintained, and ground processing for making the inner peripheral surface of the cylinder bore 8 rough is carried out (step 4 in FIG. 14).

The spraying gun 30 is lowered from the cylinder bore 8 while rotating, and the sprayed film M is formed on the inner peripheral surface of the cylinder bore 8. That is, the coating processing is carried out (step 5 in FIG. 14). It is preferable, but not necessary, that the sprayed film M is formed while operating the discharge fan 49 shown in FIG. 1 so as to suck high temperature gas generated by operation of the spraying gun 30 from the discharge duct 48. With this, outside air can be taken into the cylinder block 2 from the liner hole 14 of the dummy head 10, the air is discharged from discharge duct 48, and the molten particles can be sprayed.

When the dummy head 10 is mounted on the cylinder block 2 in this manner, the lower end abutment surface 11 is in intimate contact with the cylinder block 2. The spraying gun 30 is rotated, and it is lowered into the protection mask 15 to spray the molten particles. The sprayed film M adheres to the protection mask 15 and not to the dummy head 10. Thus, a sprayed film removing operation of the dummy head 10 becomes unnecessary.

If the forming operation of the sprayed film M is completed, the protection mask 15 is detached from the liner hole 14 of the dummy head 10 by the mask attaching/detaching robot 41 (step 6 of FIG. 14) and removing processing of the sprayed film M is carried out (step 7 of FIG. 14).

Figure 12A:
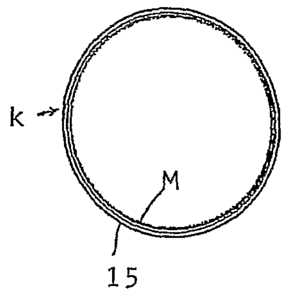
FIGS. 12A to 12E are schematic plan sectional views showing a separating operation of the sprayed film in the order of steps.
Figure 13A:
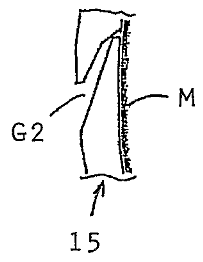
FIGS. 13A, 13B and 13C are enlarged views showing essential portions in FIGS. 12A to 12E.

As shown in FIG. 12A, the sprayed film M adheres to the inner peripheral surface of the protection mask 15. Since the opening K has a gap G2 into which the tool 53 can be inserted as shown in FIG. 13A, however, the sprayed film M is peeled using the gap G2. Next, operation for peeling off the sprayed film M is described.

Firstly, the protection mask 15 is mounted on the sprayed film removing apparatus 50. The protection mask 15 is held by the mask attaching/detaching robot 41, disposed between the three outer rollers 51. After the protection mask 15 is placed on the support roller(s) 54 disposed below the outer rollers 51, the outer rollers 51*b* and 51*c* are moved inward in the spraying direction, abutted against the outer peripheral surface of the protection mask 15 and pressurized, and the protection mask 15 is held by the outer rollers 51.

Figure 12B:
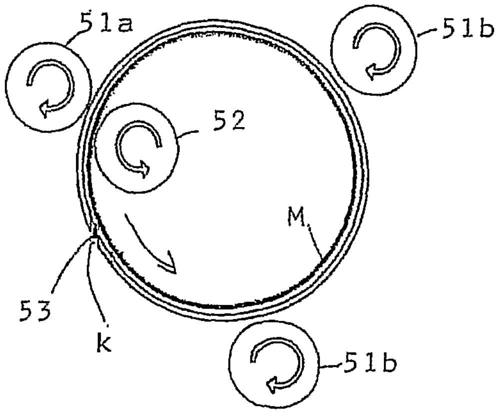

As shown in FIG. 12B, the protection mask 15 is pinched between the outer roller 51*a* and the inner roller 52 under pressure, and in this state the protection mask 15 is rotated in the direction of the hollow arrow.

Figure 13B:
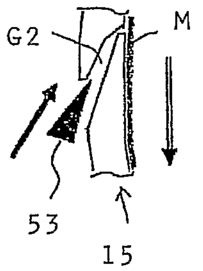
Figure 13C:
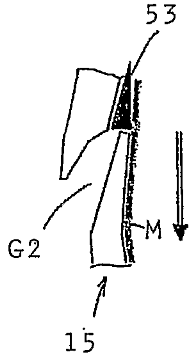

The tool 53 is inserted from the gap of the opening K of the rotating protection mask 15 (see FIG. 13B). Where the protection mask 15 has elasticity, a portion of the protection mask 15 near the opening K is also elastically deformed outward when the tool 53 is inserted, and the tool 53 can be inserted easily.

If the tool 53 is inserted, the sprayed film M is peeled from the protection mask 15, but the protection mask 15 expands outward in the spraying direction by its elasticity. As a result, the peeling performance of the sprayed film M can be enhanced. The sprayed film M is not adhered strongly as compared with a welded film, but the sprayed film M is adhered to the protection mask 15 mechanically, and thus the sprayed film M can be peeled with a relatively small force.

Figure 12C:
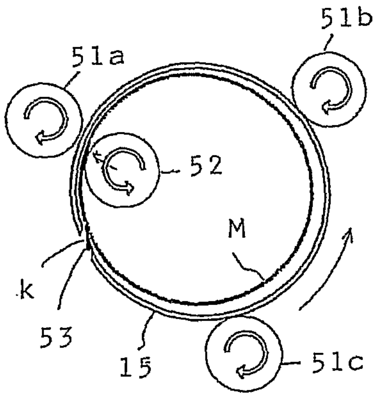

The outer roller 51*a* and the inner roller 52 rotate the protection mask 15 at least one complete circumference, the sprayed film M adhered to the inner peripheral surface of the protection mask 15 is peeled off, and then the inner roller 52 moves away from the outer roller 51*a*. As a result, the protection mask 15 is expanded by its own elasticity. As shown in FIG. 12C, the protection mask 15 comes into contact with the next outer rollers 51*b* and 51*c* to come into contact with the three outer rollers 51 to stably rotate.

According to the sprayed film removing apparatus and the sprayed film removing method of this embodiment, the protection mask 15 to which the sprayed film M is adhered is rotated around its axis by the outer roller 51*a* and the inner roller 52, the tool 53 is inserted through the opening K of the protection mask 15, and the sprayed film M is peeled from the protection mask 15. Therefore, the sprayed film M can automatically be peeled off from the protection mask 15, and it is possible to simply and easily carry out the sprayed film removing operation.

Figure 12D:
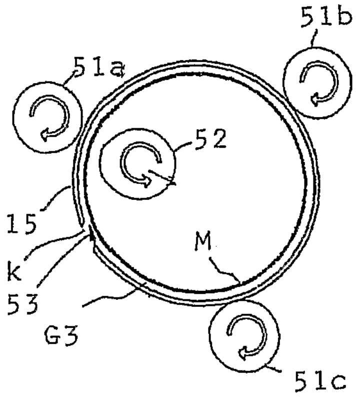

If the sprayed film M is peeled off from the protection mask 15, a gap G3 is formed between the inner peripheral surface of the protection mask 15 and the outer peripheral surface of the sprayed film M as shown in FIG. 12D. Although the protection mask 15 is held by the three outer rollers 51, the sprayed film M is not expanded and is separated from the protection mask 15. Therefore, support of the sprayed film M is lost, the sprayed film M drops due to its own weight, and it can be discharged without requiring any additional means.

If the tool 53 is always biased by a spring or the like in the retreating direction, the protection mask 15 turns, and when the position of the opening K matches with the position of the tool 53, the tool 53 is automatically pulled out from the protection mask 15.

Figure 12E:
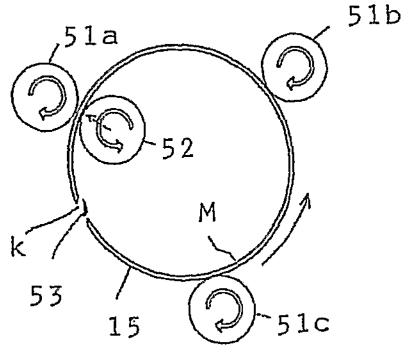

As shown in FIG. 12E, in a state where the protection mask 15 from which the sprayed film M is separated is held by the three outer rollers 51, the inner roller 52 is moved toward the opposed one outer roller 51*a*. With this, the protection mask 15 is again pinched between the outer roller 51*a* and the inner roller 52. If the outer roller 51*a* and the inner roller 52 are driven in this state, they are rotated in pinched state.

At that time, if the sprayed film M does not remain on the protection mask 15, the position of the inner roller 52 is moved outward by the thickness of the sprayed film M over the entire circumference of the protection mask 15, but if the sprayed film M remains, the inner roller 52 abuts against a portion where the remaining sprayed film M exists, and it does not move outward. Therefore, if the position of the inner roller 52 is compared with that before and after the sprayed film M is removed, this apparatus itself can detect whether the protection mask 15 has a removing failure of the sprayed film M, or whether the sprayed film M is normally removed from the protection mask 15, without using any other detecting device. That is, not only the peeling operation of the sprayed film M can be automated, but also the inspecting operation can be automated (step 8 of FIG. 14).

The cylinder bore 8 of the cylinder block 2 is subjected to finish processing, which is honing (step 9 of FIG. 14), and then the dummy head is detached from the cylinder block 2 (step 10 of FIG. 14).

A second embodiment of the invention is described with reference to FIGS. 15-18.

According to the cylinder bore spraying apparatus of this embodiment, the means for fixing the cylinder block 2 is not a bolt as in the first embodiment. It is instead operated by a drive source such as a hydraulic cylinder. The shape of the protection mask is not a thin cylindrical shape as in the first embodiment, and the protection mask has a head and a leg as described in additional detail hereinafter.

Figure 15:
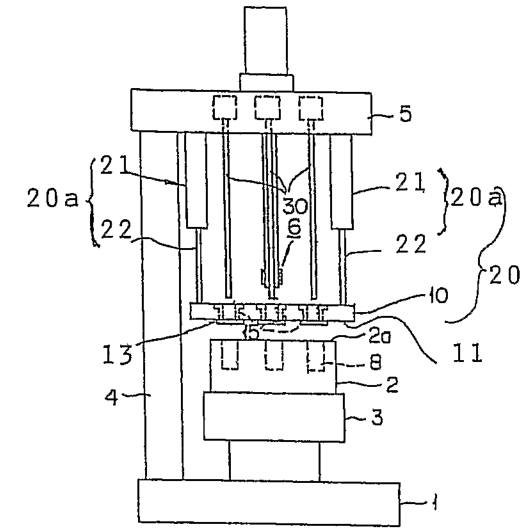
FIG. 15 is a schematic side view showing a second embodiment of the invention.

As shown in FIG. 15, the spraying apparatus includes a pressing apparatus 20 that presses a cylinder head mounting surface 2*a* of the cylinder block 2, a spraying gun 30 that injects spraying particle to the inner peripheral surface of the cylinder bore 8 to form a sprayed film M and a honing head 6 that subjects a surface of the sprayed film M formed by the spraying gun 30 to finish processing. The pressing apparatus 20 includes the dummy head 10 and a pressurizing apparatus 20*a* that presses the dummy head 10 against the cylinder block 2.

A support stage 3 and a strut 4 stand on a base 1. The support stage 3 is provided on the base 1 vertically, and the cylinder block 2 placed on an upper portion of the support stage 3 is fixed in position and held by a clamp member (not shown). The strut 4 is provided at its top with a top plate 5. The honing head 6, the spraying gun 30 and the pressurizing/driving apparatus 20*a* are suspended from the top plate 5.

The pressurizing/driving apparatus 20*a* includes a hydraulic cylinder 21 suspended from the top plate 5, and a push rod 22 projecting from the hydraulic cylinder 21. Bolt holes 24 of the dummy head 10 are connected to lower ends of the push rods 22.

A plurality of liner holes 14 are formed in the dummy head 10, and protection masks 15 are mounted on the liner holes 14. The lower end abutment surface 11, which is a lower surface of the dummy head 10, is formed with a projection 13 at a later-described predetermined position. This projection 13 presses the cylinder head mounting surface 2*a* of the cylinder block 2 and forms the deformation state of the cylinder bore 8 as previously described with reference to FIGS. 4 and 5.

The protection mask 15 is made of metal material and is detachably provided in the liner hole 14. If the protection mask 15 is provided in the liner hole 14, the protection mask 15 has rigidity even if the protection mask 15 is thinned since the protection mask 15 is held by the dummy head 10.

Figure 16:
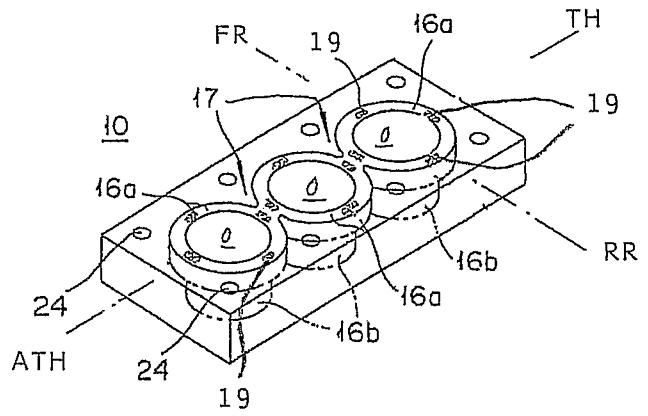
FIG. 16 is a perspective view showing a state where the protection mask is mounted on a body according to the second embodiment.
Figure 17:
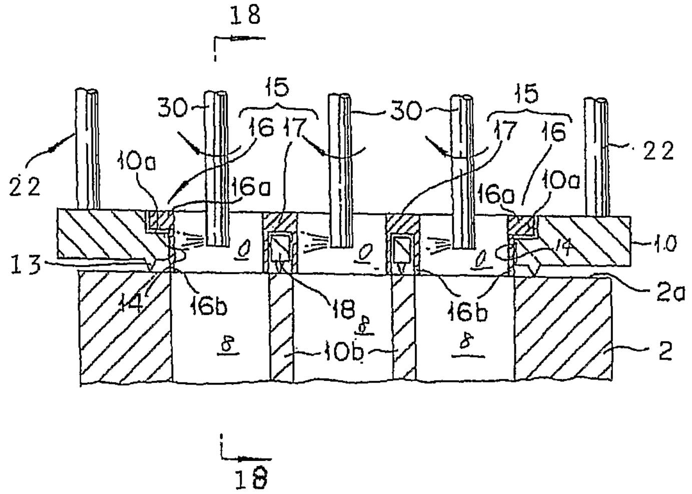
FIG. 17 is a sectional view of a dummy head portion.
Figure 18:
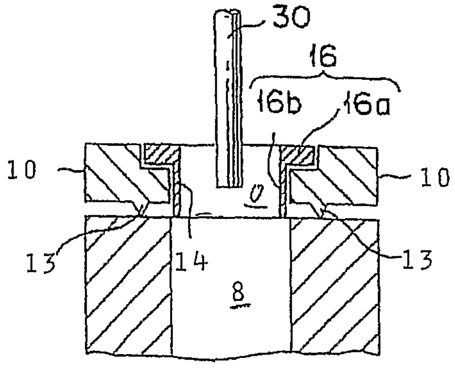
FIG. 18 is a cross-sectional view taken along the line 18-18 in FIG. 17.

As shown in FIGS. 16-18, the protection mask 15 includes a relatively thick ring-like head 16*a*, a thin leg 16*b* integrally formed with the head 16*a* and a connecting portion 17 that connects the thin leg 16*b* and the head 16*a* with each other. The head 16*a* is disposed in a groove 10*a* formed in an opening edge of an upper portion of the liner hole 14, and a lower end of the thin leg 16*b* is suspended to the cylinder head mounting surface 2*a* of the cylinder block 2. A through-hole O is formed in the protection mask 15. The spraying gun 30 or the honing head 6 is inserted through the through-hole O. Since the head 16*a* is fitted and inserted into the groove 10*a*, the liner hole 14 is not unnecessarily narrowed. The protection mask 15 includes the thick ring-like head 16*a*, so the rigidity of the entire protection mask 15 is enhanced, and the protection mask 15 can be reused many times.

Since the plurality of liner holes 14 are formed in the dummy head 10 as shown in FIG. 17, an intermediate wall 18 between the liner holes 14 becomes thin, and the dummy head 10 can be too narrow to dispose the protection mask 15. Accordingly, in this embodiment, an upper portion of the intermediate wall 18 is deleted so that the connecting portion 17 can be disposed here. Therefore, the protection mask 15 can easily be mounted or detached only by providing the connecting portion 17 astride the intermediate wall 18.

Like the first embodiment, each bolt hole 24 is provided at a position surrounding a liner hole 14, i.e., at an intermediate portion between a thrust-anti-thrust direction (TH-ATH direction) and a front-rear direction (FR-RR direction). A lower end of the push rod 22 of the pressurizing/driving apparatus 20*a* is connected to the intermediate portion.

Deformation of the cylinder bore 8 is generated by pressing an upper surface 2*a* of the cylinder block 2 by means of the projection 13 provided on the lower surface of the dummy head 10. Four locations (see cross-hatching areas 19 in FIG. 16), i.e., front-rear direction positions (front position FR, rear position RR) and thrust-anti-thrust direction positions (thrust position TH, anti-thrust position ATH) of the cylinder bore 8 are pressed by the projection 13, and the pressed position is not an annular shape as in the first embodiment.

With this pressing, the cylinder bore 8 does not receive the influence of the bolt. However, portions of the cylinder bore 8 between the front position FR, the rear position RR, the thrust position TH and the anti-thrust position ATH that are lower than the upper surface by a predetermined length (L) swell inward by the projections 13 at the four locations. Accordingly, the deformation of the cylinder bore 8 generated when fastening the bolt during normal operation can be simulated.

The spraying gun 30 is provided on the top plate 5 such that the spraying gun 30 can vertically move and rotate around its axis. The spraying gun 30 injects spraying particles from a nozzle at a lower end thereof toward the inner peripheral surface 8*a* of the cylinder bore 8 of the cylinder block 2 to form the sprayed film M.

The spraying particles are sprayed in a state where the spraying gun 30 is inserted into the cylinder bore 8 through the through-hole O of the protection mask 15, and the spraying gun 30 is rotated around its axis. In order to uniformly form the sprayed film M on the inner peripheral surface 8*a* of the cylinder bore 8, it is preferable to start spraying at the protection mask 15. Thus, the spraying particles form the sprayed film M adhered to the inner surface of the protection mask 15.

According to one embodiment, the sprayed film M adhered to the protection mask 15 can be removed by deforming the entire protection mask 15. By expanding and contracting the protection mask in the thrust-anti-thrust direction of the liner hole 14, and by expanding, contracting and deforming the protection mask in the front-rear direction, the sprayed film M can be removed from the protection mask 15.

Figure 19:
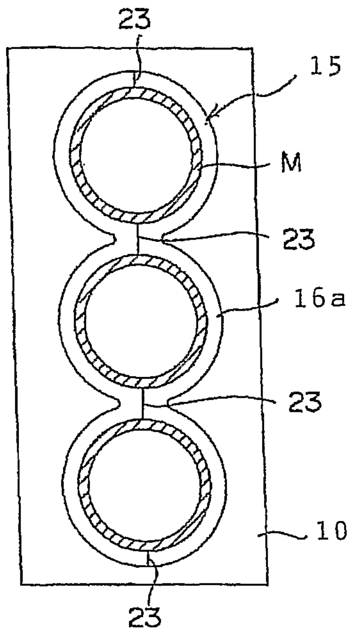
FIG. 19 is a schematic sectional view showing sprayed film removing means.
Figure 20A:
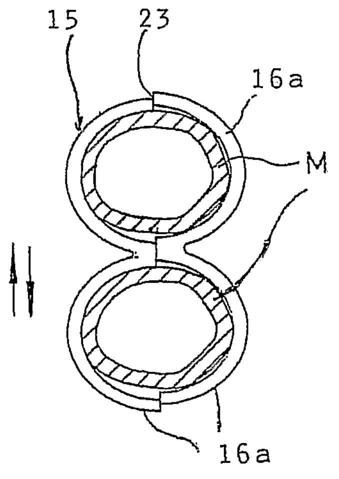
FIGS. 20A and 20B are schematic sectional views showing a removing state of the sprayed film.
Figure 20B:
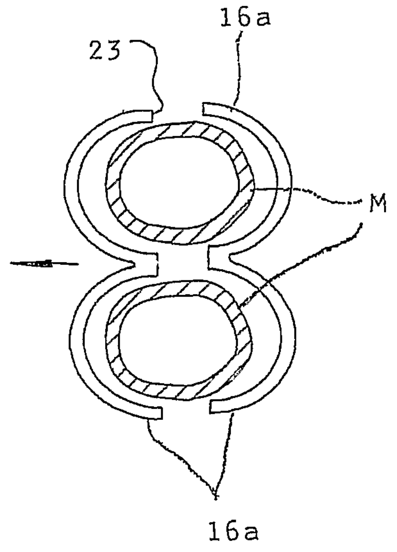

Alternatively, and as shown in FIG. 19, a slit 23 that can deform a portion of the protection mask 15 with respect to other portion thereof is provided in the protection mask 15 to provide the function of removing the sprayed film M. If this slit 23 is provided in the protection mask 15 itself in this manner, the sprayed film M can be removed extremely easily. When the slit 23 is provided along the center line of the protection mask 15, for example, the sprayed film M can easily be removed from the protection mask 15 if the protection mask 15 detached from the liner hole 14 of the dummy head 10 is deformed such that a left portion of the protection mask 15 having the head 16*a* to which the sprayed film M is adhered is deviated from a right portion of the protection mask 15 as shown in FIG. 20A. As shown in FIG. 20B, the dummy head 10 may be slid in a direction intersecting with the slit 23 in the thrust-anti-thrust direction.

In this means for removing the sprayed film, a force is applied to the connecting portion 17 of the protection mask 15. Since the connecting portion 17 is relatively thick such that the connecting portion 17 straddles on the intermediate wall 18 between the liner holes 14, the rigidity of this portion is high. Accordingly, even if stress is generated in the connecting portion 17, this portion is strong, and the protection mask 15 can be reused.

Figure 21:
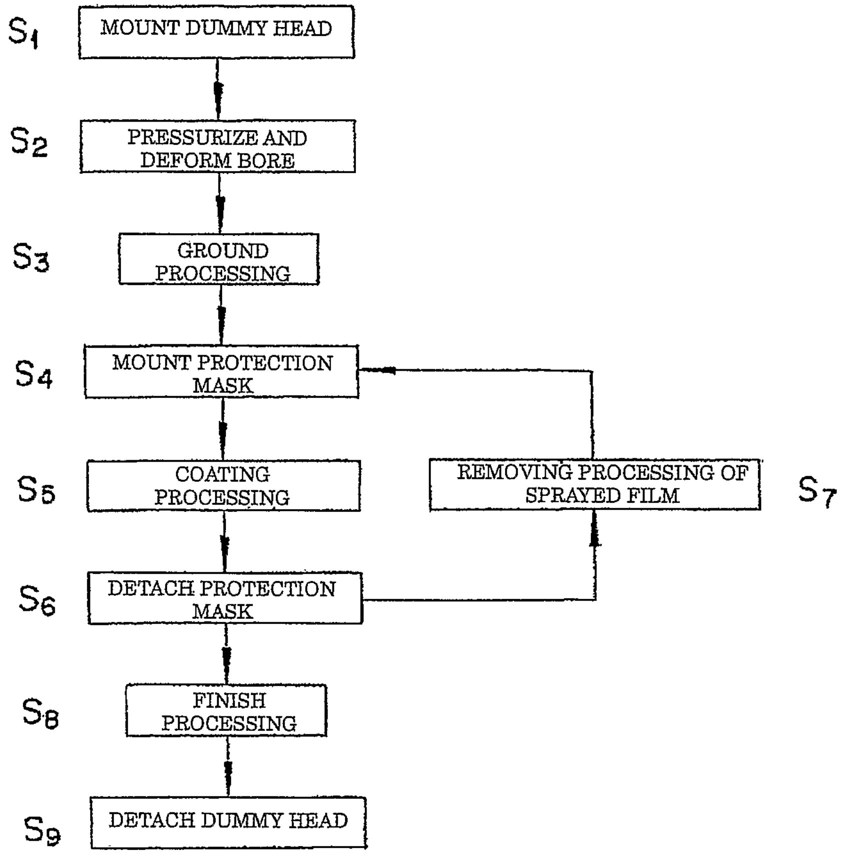
FIG. 21 is a flowchart showing forming steps of the sprayed film in the cylinder bore.

Next, the forming operation of the sprayed film M is explained in sequential order with reference to FIG. 21.

The formation of the sprayed film M first mounts the dummy head 10 on the cylinder block 2 (step 1). That is, the cylinder block 2 is placed on the support stage 3 and is fixed and held by a clamp member. Then, the dummy head 10 is lowered, and the dummy head 10 is set on the cylinder head mounting surface 2*a* of the cylinder block 2.

Next, the deformed state of the cylinder bore 8 generated when the cylinder block 2 is fastened to the cylinder block 2 by a bolt is previously generated, and it is pressed by the pressing apparatus 20 (step 2). The pressing force of the pressing apparatus 20 is controlled by a control device (not shown).

This pressing operation is carried out by lowering the push rod 22 by the hydraulic cylinder 21 and pressurizing the cylinder block 2 through the dummy head 10. The pressurizing force of the hydraulic cylinder 21 is transmitted to the dummy head 10 through the push rod 22, and the projection 13 strongly pressurizes the cylinder head mounting surface 2*a*, which is the upper surface of the cylinder block 2, substantially through a gasket (not shown).

This pressurizing force simulates the deformed state of the cylinder bore 8 when the cylinder head to the cylinder block 2 is fastened by a bolt.

The upper surface 2*a* of the cylinder block 2 is directly heated by a heating device so that a temperature difference is generated between the cylinder block 2 on the side of the cylinder head mounting surface and on the other side of the mounting surface. The temperature distribution state of the cylinder bore 8 during an engine operating state is reproduced, and the deformed state of the cylinder bore 8 by thermal influence may be reproduced.

This deformed state is maintained, ground processing is carried out (step 3) so that the inner peripheral surface 8*a* formed rough indented surfaces.

The protection mask 15 is mounted on the cylinder block 2 (step 4). By mounting the protection mask 15, the entire inner peripheral surface of the liner hole 14 of the dummy head 10 is covered. The spraying particles are plasma-sprayed from the spraying gun 30 while maintaining the deformed state of the cylinder bore 8, and the sprayed film M is formed, i.e., the coating processing is carried out (step 5).

According to this spraying operation in the deformed state, the sprayed film M is not unnecessarily thick as compared with a case where a sprayed film M is formed while taking a deformation margin into account, and this is advantageous in terms of cost.

As shown in FIG. 1, the supplying device 47 supplies a power source, auxiliary gas and spraying particles to the spraying robot 45, and the spraying gun 30 injects the spraying particles. The discharge fan 49 is operated, outside air is sucked from the protection mask 15 through the liner hole 14 and the cylinder bore 8, and the air is discharged form the discharge duct 48.

The outside air flow is sent through the protection mask 15. The outside air does not flow toward the inner peripheral surface of the cylinder bore 8, and it flows along the center axis. Therefore, the outside air does not affect the formation of the sprayed film M.

Next, the spraying gun 30 is inserted into the cylinder bore 8 through the through-hole O of the protection mask 15, and the spraying particles are sprayed to the inner peripheral surface of the cylinder bore 8 while rotating the spraying gun 30 around its axis, thereby forming the sprayed film M. To uniformly form the sprayed film M, the spraying operation is started from the protection mask 15, and the spraying operation reaches the inner peripheral surface 8*a* of the cylinder bore 8. Therefore, spraying particles adhere to the inner peripheral surface of the protection mask 15.

In this embodiment, since the operation is carried out in a state where the protection mask 15 is disposed in the liner hole 14 and the sprayed film adheres to the protection mask 15, it is possible to prevent the sprayed film M from adhering to the dummy head 10. Accordingly, a sprayed film removing operation of the dummy head 10 is unnecessary.

If the coating processing for forming the sprayed film M on the entire inner peripheral surface of the cylinder bore 8 is completed, the protection mask 15 is detached from the cylinder block 2 (step 6 of FIG. 21). The detached protection mask 15 removes the adhered sprayed film M (step 7 of FIG. 21). This removing processing is carried out by deforming or deviating the protection mask 15 itself. The protection mask 15 from which the sprayed film M is removed is stocked in a place where the mounting operation is carried out, and the protection mask 15 is reused.

The cylinder bore 8 formed with the sprayed film M maintains the deformed state, and the honing head 6 is put into the cylinder bore 8 for honing processing, i.e., finish processing of the inner peripheral surface of the cylinder bore 8 is carried out, until a predetermined roundness and straightness are obtained (step 8 of FIG. 21). Of the sprayed film M welded to the inner peripheral surface of the cylinder bore 8 that is pressurized and deformed, a sprayed film M of a portion projecting inwardly as shown in FIGS. 5 and 6 is cut away, and the roundness and straightness of the cylinder bore 8 are enhanced.

If the pressing pressure by the pressing apparatus 20 is released and the dummy head 10 is detached from the cylinder block 2 (step 9 of FIG. 21), the operation is completed.

The present invention is not limited to the above embodiments, and the invention can variously be modified within a range of the scope of claims. For example, although the cylinder block 2 is placed on the support stage 3 on the base 1, and the dummy head 10 is lowered from above for pressurizing in the above embodiments, any apparatus can be used as long as the apparatus has at least the pressing apparatus and the spraying means.

The invention can easily reuse a protection mask that is used when a sprayed film is formed on an inner peripheral surface of a cylinder bore.

The above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A spraying apparatus for forming a sprayed film on an inner peripheral surface of a cylinder bore of a cylinder block, comprising:

a cylinder block pressing apparatus that includes a dummy head that is cylinder head-shaped and includes a liner hole, wherein the cylinder block pressing apparatus causes a deformed state of the cylinder bore of the cylinder block when the cylinder block is pressed through the dummy head;

spraying means that injects molten particles to the inner peripheral surface of the cylinder bore to form a sprayed film; and a protection mask detachably attached to the liner hole of the dummy head and formed such that spraying particles adhered to the inner peripheral surface of the cylinder bore do not adhere to the dummy head.

2. The spraying apparatus of claim 1, wherein:

the protection mask comprises a thin cylindrical metal plate having elasticity in a spraying direction.

3. The spraying apparatus of claim 2, wherein:

the protection mask includes a slit extending over an entire length of the metal plate in its axial direction.

4. The spraying apparatus of claim 3, wherein:

a length of the protection mask in its axial direction is longer than a depth of the liner hole of the dummy head.

5. The spraying apparatus of claim 2, wherein:

a length of the protection mask in its axial direction is longer than a depth of the liner hole of the dummy head.

6. The spraying of claim 1, wherein the dummy head has a plurality of liner holes and the protection mask further comprises:

a plurality of heads, each being a thick ring disposed in a groove formed in an opening edge of each of the liner holes of the dummy head;

a thin leg integrally formed with each head and accommodated in a respective one of the liner holes; and a connecting portion that connects the plurality of heads with each other.

7. The spraying apparatus of claim 6, wherein:

the dummy head has a plurality of liner holes and the connecting portion straddles an intermediate portion between the plurality of liner holes.

8. The spraying apparatus of claim 1, wherein the protection mask further comprises:

sprayed film removing means for peeling the sprayed film adhered to an inner peripheral surface of the protection mask.

9. The spraying apparatus of claim 8, wherein:

the sprayed film removing means is a slit in the protection mask that can deform a portion of the protection mask with respect to other portions of the protection mask.

10. A sprayed film forming method for forming a sprayed film on an inner peripheral surface of a cylinder bore of a cylinder block, comprising:

pressing a dummy head having a cylinder head-shaped liner hole against the cylinder block to cause a deformed state of the cylinder bore of the cylinder block;

inserting a spraying device into the cylinder bore through the liner hole of the dummy head after pressing the dummy head against the cylinder block; and injecting molten particles from a spraying device with the cylinder bore in the deformed state and in a state where a protection mask is detachably attached to the liner hole to form the sprayed film on the inner peripheral surface of the cylinder bore.

11. The sprayed film forming method of claim 10, further comprising:

subjecting a surface of the sprayed film formed on the inner peripheral surface of the cylinder bore to a finish processing with the cylinder bore in the deformed state after the sprayed film is formed on the inner peripheral surface of the cylinder bore.

12. The sprayed film forming method of claim 11, further comprising:

detaching the protection mask from the dummy head before the finish processing of the sprayed film.

13. The sprayed film forming method of claim 10, wherein:

the protection mask comprises a thin cylindrical metal plate having elasticity in a spraying direction and including a slit-like opening extending over an entire length of the metal plate in its axial direction.

14. The sprayed film forming method of claim 10, wherein:

a length of the protection mask in its axial direction is longer than a depth of the liner hole of the dummy head.

15. The sprayed film forming method of claim 10, wherein the dummy head has a plurality of liner holes and the protection mask further comprises:

a plurality of heads, each being a thick ring disposed in a groove formed in an opening edge of each of the liner holes of the dummy head;

a thin leg integrally formed with each head and accommodated in a respective one of the liner holes; and a connecting portion that connects the plurality of heads with each other, the connecting portion straddling an intermediate portion between a plurality of liner holes of the dummy head.

16. The sprayed film forming method of claim 10, further comprising:

peeling the sprayed film adhered to an inner peripheral surface of the protection mask from the inner peripheral surface of the protection mask.

17. The sprayed film forming method of claim 10, wherein:

peeling the sprayed film adhered to the inner peripheral surface of the protection mask comprises deforming a portion of the protection mask with respect to other portions of the protection mask at a slit in the protection mask.

* * * * *